US008531149B2

(12) United States Patent
Kataoka et al.

(10) Patent No.: US 8,531,149 B2
(45) Date of Patent: Sep. 10, 2013

(54) CONTROL DEVICE FOR MACHINE TOOL

(75) Inventors: Akihito Kataoka, Aichi (JP); Mitsuaki Adachi, Aichi (JP)

(73) Assignee: OKUMA Corporation, Aichi (JP)

( * ) Notice: Subject to any disclaimer, the term of this patent is extended or adjusted under 35 U.S.C. 154(b) by 292 days.

(21) Appl. No.: 13/071,704

(22) Filed: Mar. 25, 2011

(65) Prior Publication Data

US 2011/0234141 A1    Sep. 29, 2011

(30) Foreign Application Priority Data

Mar. 29, 2010    (JP) ................................. 2010-075983

(51) Int. Cl.
*G05B 19/18*    (2006.01)

(52) U.S. Cl.
USPC .......................................... 318/569; 318/570

(58) Field of Classification Search
USPC ................. 318/560–563, 569–571, 594, 595, 318/758, 68, 77, 85, 362, 380; 407/20–29; 408/22–26; 409/8–24
See application file for complete search history.

(56) References Cited

U.S. PATENT DOCUMENTS

| 4,107,654 A * | 8/1978 | Nishijima .................. 318/568.1 |
| 4,678,980 A * | 7/1987 | Sugimoto et al. ............ 318/759 |
| 5,777,450 A * | 7/1998 | Kono et al. ............... 318/568.11 |
| 5,814,956 A * | 9/1998 | Kono et al. .................... 318/380 |
| 6,626,735 B2 * | 9/2003 | Ammi ................................ 451/5 |
| 8,030,878 B2 * | 10/2011 | Iwashita et al. ............... 318/802 |

FOREIGN PATENT DOCUMENTS

| JP | 10263973 A * | 10/1998 |
| JP | 3001377 B | 1/2000 |
| JP | 3369346 B | 1/2003 |

* cited by examiner

*Primary Examiner* — Eduardo Colon Santana
(74) *Attorney, Agent, or Firm* — McCarter & English, LLP

(57) ABSTRACT

A control device which controls a servo motor of a machine tool in the event of power failure is provided. The control device includes a power failure detecting unit (10') which monitors an input power supply (1) and when power failure is detected, instructs servo motor amplifiers (3, 4) to decelerate and stop servo motors (7, 8) while maintaining a controlled state, and instructs a spindle motor (9) to suspend application of electricity, an alarm threshold changing unit (11) which, in response to a power failure detection signal from the power failure detecting unit (10'), changes alarm threshold values for direct current voltage reduction abnormality of a power circuit (2), the servo motor amplifiers (3, 4), and a spindle motor amplifier (5) from values for a normal operation to values during power failure, and a retraction operation instructing unit (12) which, in response to the power failure detection signal from the power failure detecting unit (10'), instructs servo motor amplifiers (3, 4) to perform a retraction operation by a small distance which is defined in advance.

6 Claims, 3 Drawing Sheets

A: WHEN CONTROL DEVICE OF PRESENT INVENTION IS NOT EMPLOYED

B: WHEN CONTROL DEVICE OF PRESENT INVENTION IS EMPLOYED

CONTROL DEVICE FOR MACHINE TOOL

CROSS-REFERENCE TO RELATED APPLICATION

This application claims priority to Japanese Patent Application No. 2010-75983, filed on Mar. 29, 2010, which is incorporated herein by reference in its entirety.

BACKGROUND

1. Technical Field

The present invention relates to a control device for a machine tool, and in particular, to control in the event of power failure.

2. Background Art

In a machine tool, a workpiece or a tool is controlled to machine the workpiece in a predetermined shape. For example, in a lathe or the like, a spindle on which the workpiece is mounted is rotationally driven by a spindle motor and a feed shaft for moving the workpiece (spindle) or the tool is linearly driven or rotationally driven by a servo motor through a ball screw, a gear, or the like. On the other hand, in a machining center or the like, a spindle on which the tool is mounted is rotationally driven by a spindle motor, and a feed shaft for moving the workpiece or the tool (spindle) is linearly driven or rotationally driven by a servo motor through a ball screw, a gear, or the like.

FIG. 3 is a block diagram showing one example control device of related art for control of the machine tool in the event of power failure. An alternate current (AC) input power supply 1 is input to a power circuit 2. The power circuit 2 converts the input AC voltage to a direct current (DC) voltage, and supplies the DC voltage to servo motor amplifiers 3 and 4 and an amplifier 5 for a spindle motor. A numerical control device 6 inputs instruction values to the amplifiers 3 and 4 for the servo motors and the amplifier 5 for the spindle motor, to machine the workpiece into a predetermined shape. The amplifiers 3 and 4 for the servo motors and the amplifier 5 for the spindle motor drive servo motors 7 and 8 and a spindle motor 9 according to the instruction values from the numerical control device 6. A power failure detecting unit 10 constantly monitors the input power supply 1, and when the power failure is detected, because the power supply precision to the motor is reduced due to reduction of the DC voltage and the workpiece and the tool cannot be precisely controlled, a suspension of electricity application is instructed to the amplifiers 3 and 4 for the servo motors and the amplifier 5 for the spindle motor so that the driving of the servo motors 7 and 8 and the spindle motor 9 can be interrupted.

When power failure occurs during machining of the workpiece, because the motive power is cut off, the servo motors 7 and 8 stop with a dynamic brake regardless of the instruction value from the numerical control device 6, and the spindle motor 9 stops in a free-run state. The servo motors 7 and 8 and the spindle motor 9 are operated in a non-controlled state until the motors stop, and thus there is a problem in that the workpiece or the tool is damaged.

As a technique for avoiding damaging of the workpiece or the tool, a method is known in which the spindle motor is decelerated and stopped under a controlled state in the event of the power failure, and the regenerative energy obtained during the deceleration is used to drive the servo motor (for example, refer to Japanese Patent No. 3001377).

In addition, as another technique for avoiding damaging of the workpiece or the tool, a method is known in which the deceleration of the spindle motor is controlled such that the regenerative energy obtained during deceleration of the spindle motor does not exceed the energy necessary for driving the servo motor (for example, refer to Japanese Patent No. 3369346).

With the above-described related art, the workpiece and the tool can be retracted to an area where there is no interference, and damaging of the workpiece or the tool can be avoided. However, with the technique of JP 3001377, a resistive electricity discharge unit for consuming redundant energy which is not consumed by the driving of the servo motor must be provided. On the other hand, in the technique of JP 3369346, the time for retracting the workpiece and the tool to the non-interfering area is elongated, and thus an uninterrupted power supply device must be provided for the numerical control device so that the control can be continued in the event of the power failure. In other words, in both techniques, there had been a problem in that the cost becomes higher because the resistive electricity discharge unit or the uninterrupted power supply device, which are unnecessary for normal control, must be provided.

An advantage of the present invention is that damaging of the workpiece or the tool is avoided by retracting the workpiece and the tool to the non-interfering area without adding the resistive electricity discharge unit or the uninterrupted power supply device.

SUMMARY

According to one aspect of the present invention, there is provided a control device which, in a machine tool which controls a servo motor, which drives a workpiece or a tool according to an instruction from a numerical control device, controls the servo motor in the event of power failure, the control device comprising a servo motor amplifier which drives the servomotor, a power failure detecting unit which monitors an input power supply, and, when power failure is detected, instructs the servo motor amplifier to decelerate and stop the servo motor while maintaining a controlled state, an alarm threshold changing unit which, in response to a power failure detection signal from the power failure detecting unit, changes an alarm threshold value for direct current voltage reduction abnormality of the servo motor amplifier from a value for a normal operation to a value for power failure, and a retraction operation instructing unit which, in response to the power failure detection signal from the power failure detecting unit, instructs the servo motor amplifier to perform a retraction operation of a small distance which is defined in advance.

According to another aspect of the present invention, it is preferable that the control device further comprises a spindle motor and a spindle motor amplifier which drives the spindle motor, wherein the power failure detecting unit instructs, when the power failure is detected, the spindle motor to suspend application of electricity, and the alarm threshold changing unit further changes an alarm threshold value for direct current voltage reduction abnormality of the spindle motor amplifier from a value for normal operation to a value for power failure.

According to another aspect of the present invention, it is preferable that the control device further comprises a power circuit which converts an alternate current input power supply to a direct current voltage to be supplied to the servo motor amplifier or the spindle motor amplifier, wherein the alarm threshold changing unit further changes an alarm threshold value for direct current voltage reduction abnormality of the power circuit from a value for a normal operation to a value for power failure.

Advantages

With various aspects of the present invention, damaging of the workpiece or the tool can be avoided by retracting the workpiece and the tool to the non-interfering area without adding the resistive electricity discharge unit or the uninterrupted power supply device.

As described, with various aspects of the present invention, a control device can be provided which can avoid damaging of the workpiece or the tool by retracting the workpiece and the tool to the non-interfering area without adding the resistive electricity discharge unit or the uninterrupted power supply device.

DESCRIPTION OF EMBODIMENT

Figure 1:
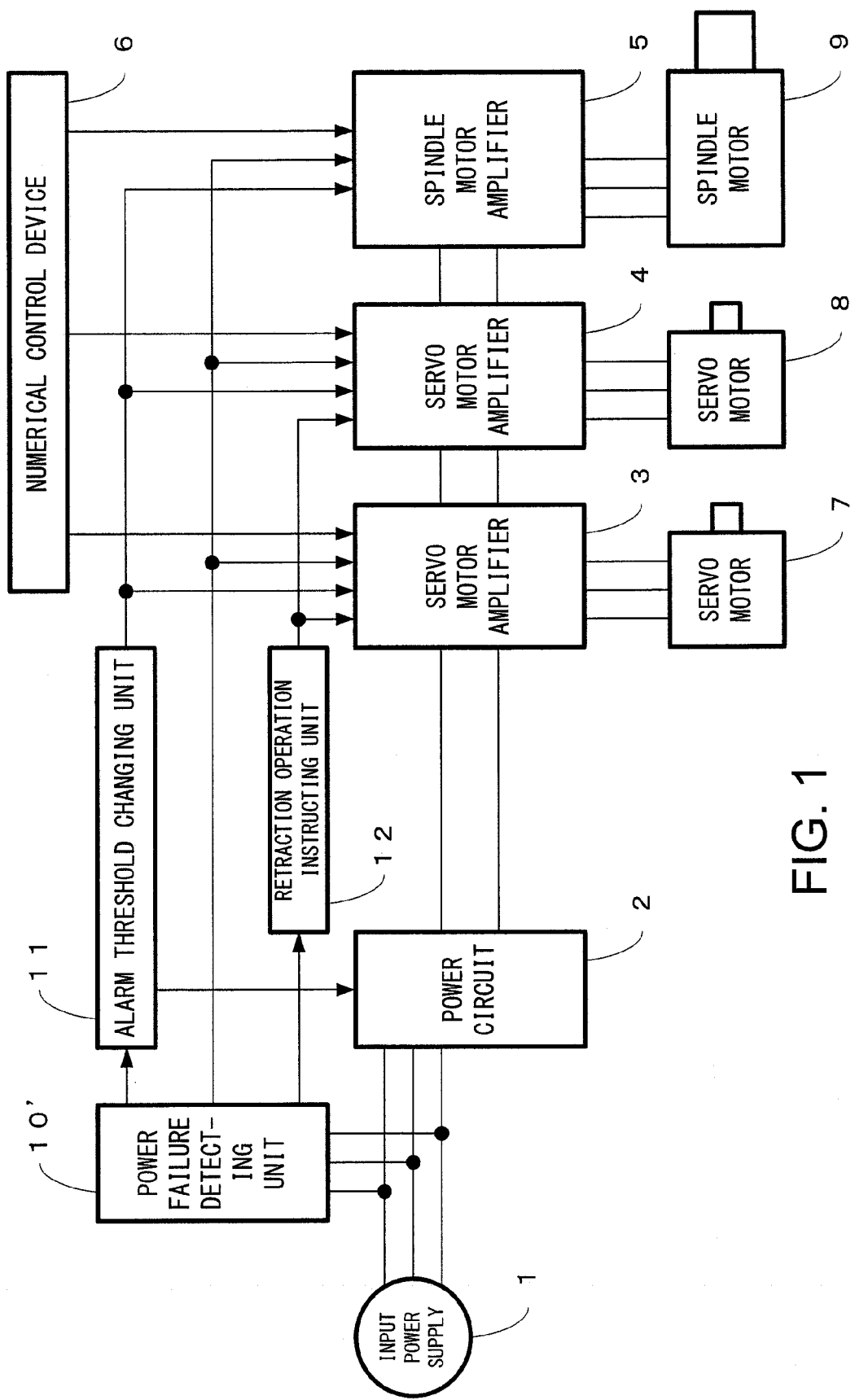
FIG. 1 is a block diagram showing a preferred embodiment of the present invention.
Figure 3:
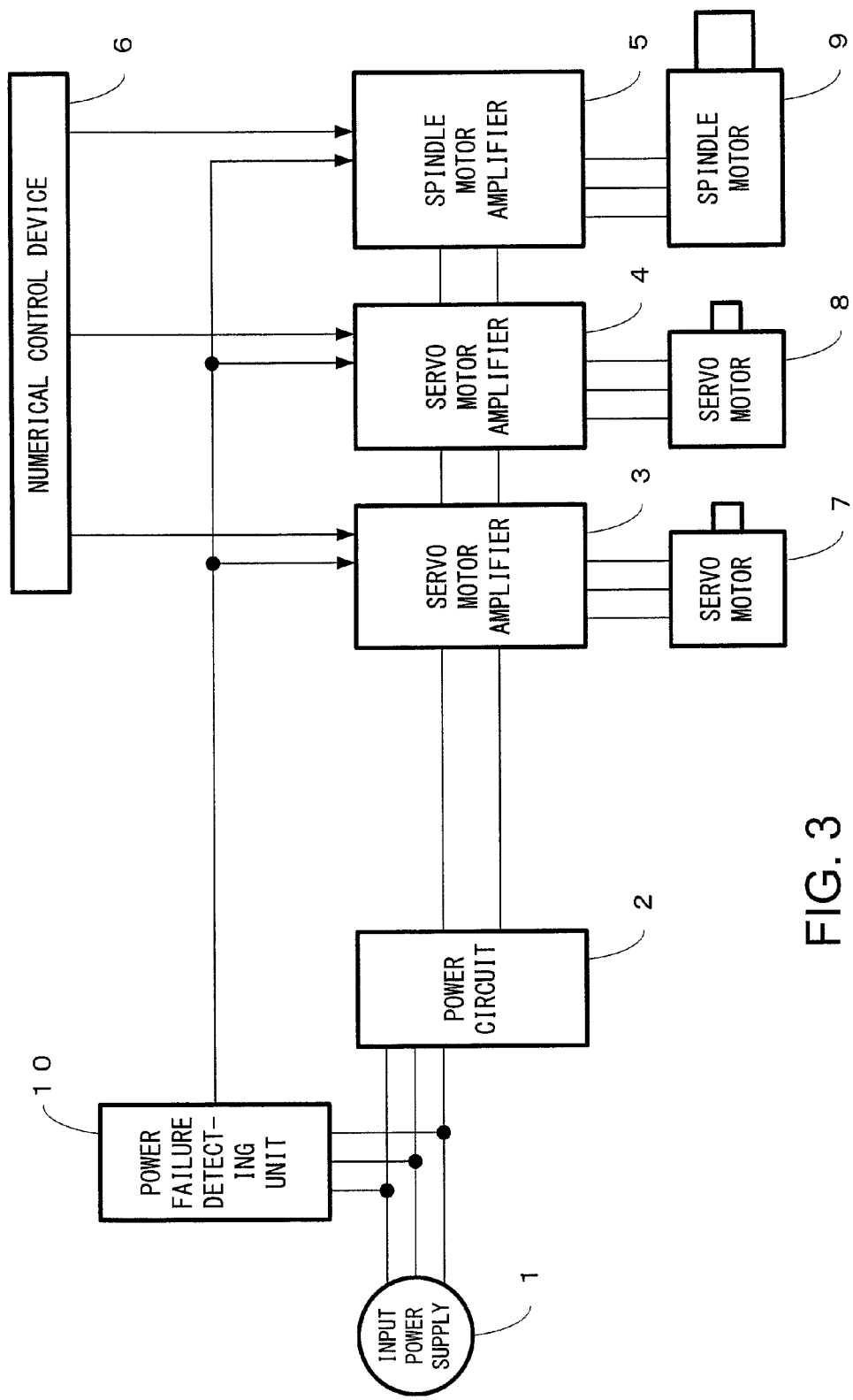
FIG. 3 is a block diagram showing the related art.

FIG. 1 is a block diagram showing a control device of a preferred embodiment of the present invention, for control of a machine tool in the event of power failure. Elements identical to the elements of the related art shown in FIG. 3 are assigned the same reference numerals and will not be described again. In addition, although a device of FIG. 1 has a structure similar to FIG. 3, with two servo motors 7 and 8 and one spindle motor 9, the present invention is not limited to such a configuration.

A power failure detecting unit 10' constantly monitors the input power supply 1, and when the power failure detecting unit 10' detects power failure, the power failure detecting unit 10' instructs deceleration and stopping to the servo motor amplifiers 3 and 4 to decelerate and stop the servo motors 7 and 8 while in a controlled state and instructs suspension of application of electricity to the spindle motor amplifier 5 to interrupt driving of the spindle motor 9. At the same time, the power failure detecting unit 10' sends a power failure detection signal to an alarm threshold changing unit 11 and a retraction operation instructing unit 12. In response to the power failure detection signal from the power failure detecting unit 10', the alarm threshold changing unit 11 changes alarm threshold values for DC voltage reduction abnormality of the power circuit 2, the servo motor amplifiers 3 and 4, and the spindle motor amplifier 5, from values for normal operation to values during power failure. In response to the power failure detection signal from the power failure detecting unit 10', the retraction operation instructing unit 12 instructs a retraction operation to the servo motor amplifiers 3 and 4 by a small distance which is defined in advance. The servo motors 7 and 8 are operated with both the deceleration and stopping operation and the retract operation, and ultimately stop at positions deviated from the instructed values from the numerical control device 6 by the small distance.

In the following, primary elements of the present embodiment will be described with reference to FIG. 2 which shows a change with respect to time of the DC voltage in the event of power failure. In general, when the DC voltage is excessively reduced, in particular, in a high-speed rotation region, a desired output power cannot be obtained due to an induced voltage generated in the servo motor and the spindle motor, and the control according to the instructed value from the numerical control device cannot be applied. In consideration of this, normally, in the power circuit and the amplifier, DC voltage reduction abnormality is detected such that an output power sufficient for the control according to the instructed value from the numerical control device can be obtained regardless of the rotational speed regions of the servo motor and the spindle motor. An alarm threshold value for the DC voltage reduction abnormality is set in advance, and regardless of the presence/absence of power failure, when the DC voltage becomes lower than the alarm threshold value, the DC voltage reduction abnormality is determined, and the application of electricity to the servomotor and the spindle motor is suspended.

In the event of power failure, the AC voltage which is input to the power circuit is rapidly lost. However, normally, a high-capacity capacitor is built in the power circuit and the amplifier to inhibit a rapid change of the DC voltage. Because of this, the DC voltage does not become zero at the same time as the occurrence of the power failure, and as shown in diagram A OF FIG. 2, the DC voltage is gradually reduced. When the control device of the present embodiment is not employed, the DC voltage would become lower than the alarm threshold value in a short time after the power failure has occurred.

In order to avoid damaging of the workpiece or the tool, the workpiece and the tool do not need to be excessively or precisely retracted to the non-interfering area. Even if the workpiece and the tool cannot be operated according to the instructed value, damaging of the workpiece or the tool can be avoided as long as the distance between the workpiece and the tool is separated by even a small distance such that the workpiece and the tool do not contact each other. Therefore, a small distance is sufficient for the retraction operation.

Figure 2:
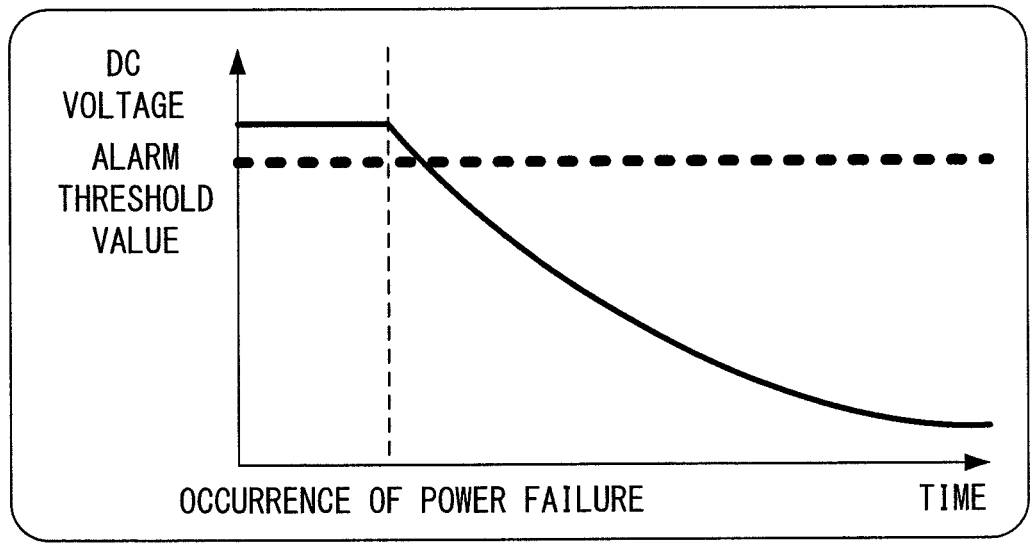
FIG. 2 is a diagram for explaining a difference in control between a case where the control device of the preferred embodiment of the present invention is employed and a case where the control device is not employed.
Figure 2:
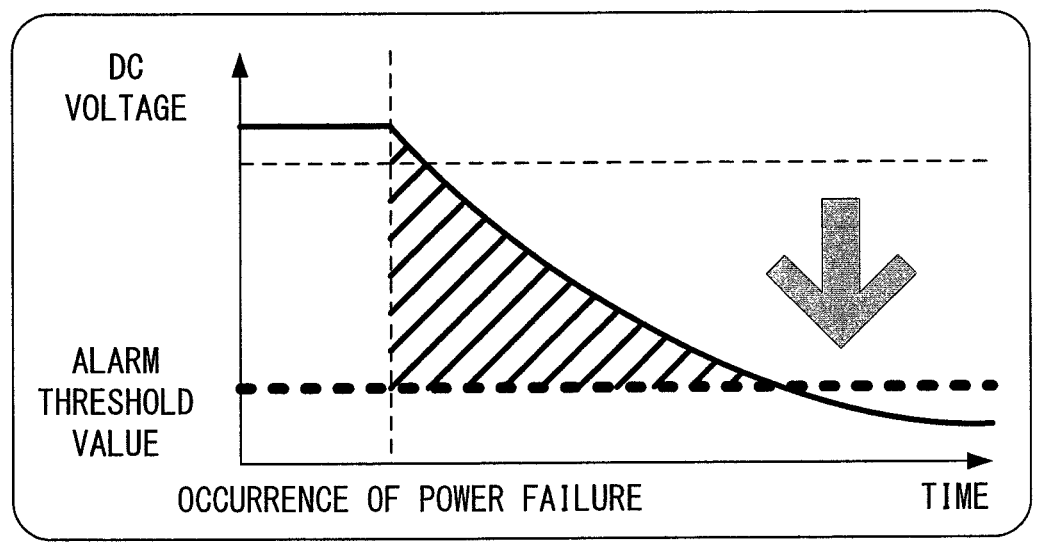

In the control device of the present embodiment, in the event of power failure, as shown in diagram B of FIG. 2, the alarm threshold value for DC voltage reduction abnormality is changed to a value lower than a value for a normal operation. With this configuration, even when the DC voltage is excessively reduced due to the power failure, the DC voltage reduction abnormality is not determined, and the application of electricity to the servo motor can be continued. In other words, during the normal operation, a sufficiently high voltage value is set as the alarm threshold value so that a sufficient output power to apply control according to the instructed value from the numerical control device can be obtained regardless of the rotational speed regions of the servo motor and the spindle motor, and a lower alarm threshold value is prepared for the event of power failure so that the value of the alarm threshold value is switched, at the same time as occurrence of the power failure is detected, to the lower value during the power failure.

In addition, in the present embodiment, because the alarm threshold value is lowered during the power failure compared to the normal operation, an energy represented by the slanted line portion of diagram B of FIG. 2 can be obtained. By using this energy, it is possible to continue the retraction operation of the servo motor to achieve a larger distance between the workpiece and the tool even in a state where the desired output power cannot be obtained at the servo motor from the input power supply 1 due to the power failure, and to consequently move the workpiece and the tool to positions where the damaging of the workpiece and the tool can be avoided.

In the above description, the servo motors 7 and 8 are retracted, but the present invention is not limited to such a configuration. For the servomotor for the retraction operation, for example, one or a plurality of servo motors may be fixedly selected in advance. Alternatively, the servo motor for the retraction operation may be suitably selected according to the shape of the workpiece being machined, positional relationship between the workpiece and the tool, or a combination of the shape of the workpiece and the positional relationship. In this case, identification information of the servo motor for the retraction operation may be registered for each shape of the workpiece being machined, each positional relationship between the workpiece and the tool, or each combination of the workpiece shape and the positional relationship, and the device may select the servo motor for the retraction which matches the current (at the time of occurrence of the power failure) condition according to the registered information. Moreover, with regard to the predefined small distance which is the retraction distance during the power failure, the distance may be fixedly set at one value in advance or may be selected according to the shape of the workpiece being machined, the positional relationship between the workpiece and the tool, or a combination between the workpiece shape and the positional relationship.

What is claimed is:

1. A control device which, in a machine tool which controls a servo motor that drives a workpiece or a tool according to an instruction from a numerical control device, controls the servo motor in the event of power failure, the control device comprising:
    a servo motor amplifier, which drives the servo motor;
    a power failure detecting unit, which monitors an input power supply, and, in turn, when power failure is detected, instructs the servo motor amplifier to decelerate and stop the servo motor while maintaining a controlled state;
    an alarm threshold changing unit, which, in response to a power failure detection signal from the power failure detecting unit, changes an alarm threshold value for direct current voltage reduction abnormality of the servo motor amplifier from a value for a normal operation to a lower value for power failure, wherein application of electricity to the servo motor is suspended when direct current voltage becomes lower than the alarm threshold value; and
    a retraction operation instructing unit, which, in response to the power failure detection signal from the power failure detecting unit, instructs the servo motor amplifier to perform a retraction operation of a small distance which is defined in advance.

2. The control device according to claim 1, further comprising:
    a spindle motor; and
    a spindle motor amplifier which drives the spindle motor, wherein the power failure detecting unit, when the power failure is detected, instructs the spindle motor to suspend application of electricity, and the alarm threshold changing unit further changes an alarm threshold value for direct current voltage reduction abnormality of the spindle motor amplifier from a value for a normal operation to a value for power failure.

3. The control device according to claim 2, further comprising:
    a power circuit which converts an alternate current input power supply to a direct current voltage to be supplied to the servo motor amplifier or the spindle motor amplifier, wherein the alarm threshold changing unit further changes an alarm threshold value for direct current voltage reduction abnormality of the power circuit from a value for a normal operation to a value for power failure.

4. A control method of controlling, in a machine tool which controls a servo motor that drives a workpiece or a tool according to an instruction from a numerical control device, the servo motor in the event of power failure, the control method executing the following processes when power failure is detected by monitoring an input power supply:
    a process to instruct a servo motor amplifier which drives the servo motor to decelerate and stop the servo motor while maintaining a controlled state;
    a process to change an alarm threshold value for direct current voltage reduction abnormality of the servo motor amplifier from a value for a normal operation to a lower value for power failure, wherein application of electricity to the servo motor is suspended when direct current voltage becomes lower than the alarm threshold value; and
    a process to instruct the servo motor amplifier to perform a retraction operation of a small distance, which is defined in advance.

5. The control method according to claim 4, wherein the machine tool further comprises a spindle motor, and the control method further executes the following processes when the power failure is detected by monitoring the input power supply:
    a process to instruct the spindle motor to suspend application of electricity; and
    a process to change an alarm threshold value for direct current voltage reduction abnormality of a spindle motor amplifier which drives the spindle motor from a value for a normal operation to a value for power failure.

6. The control method according to claim 5, wherein the machine tool further comprises a power circuit which converts an alternate current input power supply to a direct current voltage to be supplied to the servo motor amplifier or the spindle motor amplifier, and the control method further executes the following process when the power failure is detected by monitoring the input power supply:
    a process to change an alarm threshold value for direct current voltage reduction abnormality of the power circuit from a value for a normal operation to a value for power failure.

* * * * *